(12) United States Patent
Shutou et al.

(10) Patent No.: US 8,390,764 B2
(45) Date of Patent: Mar. 5, 2013

(54) COMPOSITE POLARIZING PLATE HAVING A LIGHT DIFFUSION PRESSURE-SENSITIVE ADHESION LAYER AND LIQUID CRYSTAL DISPLAY DEVICE

(75) Inventors: Shunsuke Shutou, Ibaraki (JP); Hiroyuki Takemoto, Ibaraki (JP); Takehito Fuchida, Ibaraki (JP); Akinori Nishimura, Ibaraki (JP)

(73) Assignee: Nitto Denko Corporartion, Ibaraki-shi, Osaka (JP)

( * ) Notice: Subject to any disclaimer, the term of this patent is extended or adjusted under 35 U.S.C. 154(b) by 246 days.

(21) Appl. No.: 12/729,780

(22) Filed: Mar. 23, 2010

(65) Prior Publication Data
US 2010/0238379 A1 Sep. 23, 2010

(30) Foreign Application Priority Data
Mar. 23, 2009 (JP) .................................. 2009-069918

(51) Int. Cl.
*G02F 1/1335* (2006.01)
(52) U.S. Cl. ........................................... 349/64; 349/96
(58) Field of Classification Search .................... 349/96; 359/499, 500
See application file for complete search history.

(56) References Cited

U.S. PATENT DOCUMENTS

| | | | |
|---|---|---|---|
| 6,717,642 B2 * | 4/2004 | Sasaki et al. ................... | 349/118 |
| 7,405,774 B2 * | 7/2008 | Cho et al. ......................... | 349/12 |
| 7,553,059 B2 * | 6/2009 | Kuroda et al. ................. | 362/607 |
| 2003/0147042 A1 * | 8/2003 | Kawamoto et al. ............ | 349/194 |
| 2005/0151896 A1 * | 7/2005 | Hara et al. ....................... | 349/96 |
| 2005/0207137 A1 | 9/2005 | Nishikawa et al. | |
| 2006/0098137 A1 * | 5/2006 | Kameyama et al. ............ | 349/96 |
| 2006/0292314 A1 * | 12/2006 | Yamada et al. ............... | 428/1.31 |
| 2009/0034070 A1 * | 2/2009 | Hara et al. ..................... | 359/487 |
| 2009/0059136 A1 * | 3/2009 | Okamura ......................... | 349/96 |
| 2009/0257002 A1 * | 10/2009 | Hwang ........................... | 349/65 |

FOREIGN PATENT DOCUMENTS

| | | |
|---|---|---|
| JP | 2001-201741 A | 7/2001 |
| JP | 2004-127243 A | 4/2004 |

* cited by examiner

*Primary Examiner* — Akm Enayet Ullah
(74) *Attorney, Agent, or Firm* — Westerman, Hattori, Daniels & Adrian, LLP

(57) ABSTRACT

There is provided a composite polarizing plate used for a liquid crystal display device comprising a liquid crystal cell, a front substrate, and a collimated light source device according to present invention includes a polarizer; and a light diffusion pressure-sensitive adhesion layer placed on a side of the polarizer, wherein when the composite polarizing plate is used for the liquid crystal display device, the light diffusion pressure-sensitive adhesion layer is arranged in contact with the front substrate.

3 Claims, 6 Drawing Sheets

COMPOSITE POLARIZING PLATE HAVING A LIGHT DIFFUSION PRESSURE-SENSITIVE ADHESION LAYER AND LIQUID CRYSTAL DISPLAY DEVICE

BACKGROUND OF THE INVENTION

1. Field of the Invention

The present invention relates to a composite polarizing plate capable of obtaining excellent visibility under a bright environment, reducing parallax, and thinning a liquid crystal display device, and to a liquid crystal display device using the composite polarizing plate.

2. Description of the Related Art

In a cellular phone, a plastic substrate (generally, acrylic plate) is generally placed above a liquid crystal display portion in order to impart durability and design characteristics. For an in-car display such as a car navigation system, a tablet PC frequently used for industry, a public display, and a multi-function cellular phone, a touch panel is placed on a surface of a display portion (for example, JP 2001-201741 A).

A front substrate, for example, a plastic substrate or a touch panel is normally fixed to a polarizing plate by a double-faced tape bonded to edge portion of the polarizing plate. A thickness of the double-faced tape is normally approximately 120 μm, and hence there is a problem that a total thickness of the liquid crystal display device increases. When the front substrate is used for the touch panel, in order to minimize a shock, a sponge of approximately 1,000 μm is used together with the double-faced tape, and hence the thickness further increases. Since only the edge portion is adhered by the double-faced tape, an air layer is formed between the polarizing plate and the front substrate. When the refractive index of air is approximately 1.0, a refractive index of a material, for example, polymer or glass, of the front substrate is approximately 1.4 to 1.7. Therefore, a refractive index difference between the air layer and the front substrate is large, and hence there is a problem that visibility under a bright environment is reduced by interface reflection of outside light.

Furthermore, it should be noted that a color filter layer of a liquid crystal cell normally acts as a screen. When the touch panel is used as the front substrate, input contact points correspond to a surface of the front substrate, but are provided at a distance from a surface of the liquid crystal cell serving as the screen. Therefore, there is a problem that parallax occurs.

Meanwhile, a touch panel using a plastic film as an insulating substrate has a problem that a Newton ring is generated. As a method of preventing the generation of the Newton ring, there has been known a technology of forming a satin finished surface on at least one of facing surfaces of an upper insulating substrate and a lower insulating substrate and further using a diffusion pressure-sensitive adhesive layer in combination with the satin finished surface (for example, JP 2004-127243). However, even when the touch panel described in JP 2004-127243 is used, parallax cannot be reduced.

SUMMARY OF THE INVENTION

It is an object of the present invention to provide a composite polarizing plate capable of obtaining excellent visibility under a bright environment, reducing parallax, and thinning a liquid crystal display device, and a liquid crystal display device using the composite polarizing plate.

The present inventors have conducted intensive studies for solving the above problems, and have found that the above objects can be attained with the composite polarizing plate described below, to thereby complete the present invention.

A composite polarizing plate according to an embodiment of the present invention is used for a liquid crystal display device comprising a liquid crystal cell, a front substrate, and a collimated light source device. The composite polarizing plate includes: a polarizer; and a light diffusion pressure-sensitive adhesion layer placed on a side of the polarizer, wherein when the composite polarizing plate is used for the liquid crystal display device, the light diffusion pressure-sensitive adhesion layer is arranged in contact with the front substrate.

In one embodiment of the invention, the light diffusion pressure-sensitive adhesion layer includes a pressure-sensitive adhesive and particles.

In another embodiment of the invention, the light diffusion pressure-sensitive adhesion layer has a haze equal to or larger than 90%.

According to another aspect of the present invention, a liquid crystal display device is provided. The liquid crystal display device includes a liquid crystal cell; the composite polarizing plate, which is provided on a viewer side of the liquid crystal cell; a polarizing plate opposed to the viewer side of the liquid crystal cell; a front substrate which is placed on a viewer side of the composite polarizing plate and in intimate contact with the light diffusion pressure-sensitive layer of the composite polarizing plate; and a collimated light source device placed outside the polarizing plate opposed to the viewer side of the liquid crystal cell.

In one embodiment of the invention, the front substrate comprises a transparent protective plate or a touch panel.

According to the composite polarizing plate of the present invention, the front substrate may be bonded through the light diffusion pressure-sensitive adhesion layer, and hence no air layer is formed between the polarizer and the front substrate. Therefore, interface reflection of outside light is reduced, and hence visibility under a bright environment may be improved. In particular, when the composite polarizing plate according to the present invention is used for the liquid crystal display device including the collimated light source device, a front contrast ratio improvement effect obtained by using the collimated light source device may become more significant. In addition, since the light diffusion pressure-sensitive adhesion layer is much thinner than a double-faced tape for bonding the polarizing plate to the front substrate, the liquid crystal display device may be thinned. Further, the light diffusion pressure-sensitive adhesion layer used for the liquid crystal display device including the collimated light source device has a high haze and acts as a screen. Therefore, when the touch panel is used as the front substrate, an input contact point becomes closer to the screen, and hence parallax may be reduced.

DESCRIPTION OF THE PREFERRED EMBODIMENTS

A. Overview of Composite Polarizing Plate

Figure 1:
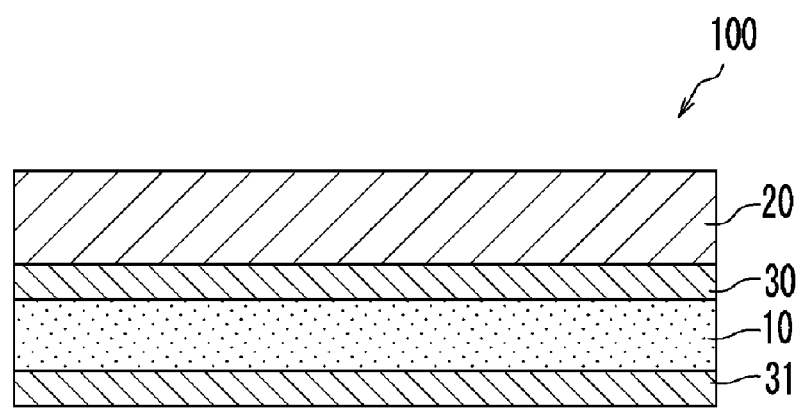
FIG. 1 is a schematic cross sectional view of a composite polarizing plate according to a preferred embodiment of the present invention.

FIG. 1 is a schematic cross sectional view of a composite polarizing plate according to a preferred embodiment of the present invention. A composite polarizing plate 100 includes a polarizer 10 and a light diffusion pressure-sensitive adhesion layer 20 placed on one side of the polarizer 10. In the illustrated example, protective films 30 and 31 are placed on both sides of the polarizer. The polarizer 10 is bonded to the protective films 30 and 31 through any suitable adhesive layers or pressure-sensitive adhesive layers. At least one of the protective layers 30 and 31 may be eliminated depending on purpose or usage.

<A-1. Polarizer>

As the polarizer 10 used in the present invention, any suitable polarizer may be employed depending on purpose. Examples of the polarizer include: a film prepared by adsorbing a dichromatic substance, for example, iodine or a dichromatic dye on a hydrophilic polymer film, for example, a polyvinyl alcohol-based film, a partially formalized polyvinyl alcohol-based film, or a partially saponified ethylene/vinyl acetate copolymer-based film, and subjecting the resultant to uniaxial stretching; and a polyene-based orientation film, for example, a dehydrated product of polyvinyl alcohol or a dehydrochlorinated product of polyvinyl chloride. Of the films, a polarizer prepared by adsorbing a dichromatic substance, for example, iodine on a polyvinyl alcohol-based film, and subjecting the resultant to uniaxial stretching is particularly preferred because of high polarized dichromaticity. A thickness of the polarizer is not particularly limited, and is generally approximately 1 μm to 80 μm.

The polarizer prepared by adsorbing iodine on a polyvinyl alcohol-based film, and subjecting the resultant to uniaxial stretching may be manufactured by, for example, immersing polyvinyl alcohol in an aqueous solution of iodine for coloring and subjecting the resultant to stretching to three to seven times the original length. If necessary, the aqueous solution may contain boric acid, zinc sulfate, or zinc chloride, or the polyvinyl alcohol may be immersed in an aqueous solution of, for example, potassium iodide. Further, if necessary, the polyvinyl alcohol-based film may be immersed and washed in water before coloring.

When the polyvinyl alcohol-based film is washed with water, contamination or antiblocking agent on a surface of the polyvinyl alcohol-based film may be removed. In addition to this, when the polyvinyl alcohol-based film is swelled, there is an effect of preventing nonuniformity, for example, uneven coloring. The stretching may be performed after coloring with iodine, performed during coloring, or followed by coloring with iodine. The stretching may be performed in an aqueous solution of boric acid or potassium iodide or in a water bath.

<A-2. Light Diffusion Pressure-Sensitive Adhesion Layer>

The light diffusion pressure-sensitive adhesion layer 20 has a function of transmitting and dispersing light which has been emitted from a light source of a liquid crystal display device and passed through a liquid crystal cell. When the composite polarizing plate according to the present invention is used for a liquid crystal display device, the light diffusion pressure-sensitive adhesion layer is placed on a viewer side and is bonded in intimate contact with the protective film 30. The light diffusion pressure-sensitive adhesion layer preferably contains a pressure-sensitive adhesive and particles. The pressure-sensitive adhesive is suitable to obtain a light diffusion pressure-sensitive adhesion layer which may satisfy both a wide-viewing angle characteristic and low glare (dazzling) because of high viscosity and excellent particle dispersibility.

A thickness of the light diffusion pressure-sensitive adhesion layer may be suitably adjusted depending on usage or diffusion performance. For example, when a shock absorption function is to be provided, the thickness is desirably adjusted to 100 μm to 1,000 μm. When thinning is required, the thickness may be adjusted in a range in which pressure-sensitive adhesive property may be provided. When a particle size and an amount of particles are adjusted, the thickness may be reduced to approximately 10 μm. The thickness of the light diffusion pressure-sensitive adhesion layer is preferably in a range of 10 μm to 100 μm, more preferably in a range of 15 μm to 90 μm, and further more preferably in a range of 20 μm to 80 μm. When the thickness of the light diffusion pressure-sensitive adhesion layer is set in the ranges described above, the thinning of the liquid crystal display device and the light diffusion performance of the light diffusion pressure-sensitive adhesion layer may be made compatible. When both the wide-viewing angle characteristic and low glare (dazzling) are required, the thickness of the light diffusion pressure-sensitive adhesion layer is appropriately equal to or larger than seven times a volume average particle diameter of particles contained in the light diffusion pressure-sensitive adhesion layer as described below.

The light diffusion performance of the light diffusion pressure-sensitive adhesion layer may be controlled by adjusting, for example, a particle constituent material, the volume average particle diameter, and the amount of particles. It is not necessarily appropriate to suggest a light diffusion half angle of the light diffusion pressure-sensitive adhesion layer (that is, half angle of light passing through and diffusing within the light diffusion pressure-sensitive adhesion layer) because of a relation with a half angle of a backlight, but the light diffusion half angle is preferably equal to or larger than 5°, and more preferably in a range of 10° to 90°.

A haze of the light diffusion pressure-sensitive adhesion layer is preferably equal to or larger than 90%, and more preferably equal to or larger than 95%. When the haze is set in the ranges described above, desired light diffusion performance is obtained and the light diffusion pressure-sensitive adhesion layer sufficiently acts as the screen, and hence parallax may be reduced. In particular, the liquid crystal display device using the collimated light source device is suitably applied because an increase in front contrast ratio and a reduction in parallax may be made compatible.

A total light beam transmittance of the light diffusion pressure-sensitive adhesion layer is preferably equal to or larger than 75%, more preferably equal to or larger than 80%, and further more preferably equal to or larger than 85%.

As the pressure-sensitive adhesive described above, any suitable pressure-sensitive adhesive may be used. Examples of the pressure-sensitive adhesive include a rubber-based pressure-sensitive adhesive, an acrylic-based pressure-sensitive adhesive, a silicone-based pressure-sensitive adhesive, an epoxy-based pressure-sensitive adhesive, and a cellulose-based pressure-sensitive adhesive. The acrylic-based pressure-sensitive adhesive is appropriate. When the acrylic-based pressure-sensitive adhesive is used, a light diffusion pressure-sensitive adhesion layer which is excellent in heat resistance and transparency is obtained. The pressure-sensitive adhesives may be used alone or in combination.

As the acrylic-based pressure-sensitive adhesive described above, Any suitable one may be used. The acrylic-based pressure-sensitive adhesive preferably has the following characteristics. A glass transition temperature of the acrylic-based pressure-sensitive adhesive is preferably in a range of −60° C. to −10° C., and more preferably in a range of −55° C. to −15° C. A weight average molecular weight of the acrylic-based pressure-sensitive adhesive is preferably in a range of 200,000 to 2,000,000, and more preferably in a range of 250,000 to 1,800,000. When the acrylic-based pressure-sensitive adhesive having such a characteristics is used, suitable pressure-sensitive adhesive property may be obtained.

A refractive index of the acrylic-based pressure-sensitive adhesive is preferably in a range of 1.40 to 1.65, and more preferably in a range of 1.45 to 1.60. When the acrylic-based pressure-sensitive adhesive having the refractive index described above is used, parallax may be further reduced.

The acrylic-based pressure-sensitive adhesive is normally obtained by polymerizing a main monomer imparting pressure-sensitive adhesive property, a comonomer imparting cohesive property, and a functional group-containing monomer imparting pressure-sensitive adhesive property and functioning as a cross-linking point. The acrylic-based pressure-sensitive adhesive having such a characteristics may be synthesized by any suitable method and may be synthesized with reference to, for example, Katsuhiko Nakamae, "Chemistry and Applications of Adhesion and Pressure-Sensitive Adhesive", published by Dainippon Tosho Co., Ltd.

The amount of pressure-sensitive adhesive contained in the light diffusion pressure-sensitive adhesion layer is preferably in a range of 50% by weight to 99.7% by weight, and more preferably in a range of 52% by weight to 97% by weight. When the amount of pressure-sensitive adhesive is set in the ranges described above, a light diffusion pressure-sensitive adhesion layer which is excellent in wide-viewing angle characteristic and low in glare may be obtained.

As the particles described above, any suitable particles may be used. Examples of the particles include inorganic fine particles and polymer fine particles. The particles are preferably the polymer fine particles. As materials of the polymer fine particles, there are exemplified a silicone resin, a polymethyl methacrylate resin, a polystyrene resin, a polyurethane resin, and a melamine resin. The particles are preferably made of the silicone resin or the polymethyl methacrylate resin. The resins have excellent dispersion property on the pressure-sensitive adhesive and a suitable refractive index difference with the pressure-sensitive adhesive, and hence a light diffusion pressure-sensitive adhesion layer having light excellent diffusion performance is obtained. A shape of the particles is not particularly limited and examples of the shape include a spherical shape, a flat shape, and an indefinite shape. The particles may be used alone or in combination.

A volume average particle diameter of the particles is preferably in a range of 1 µm to 10 µm, and more preferably in a range of 1.5 µm to 5 µm. When the volume average particle diameter is set in the ranges, excellent light diffusion performance may be obtained. The volume average particle diameter may be measured by, for example, an ultracentrifugal automatic particle size distribution measurement device.

A refractive index of the particles is preferably in a range of 1.40 to 1.70, and more preferably in a range of 1.42 to 1.65. When two or more kinds of particles are used in combination, a volume average refractive index is desirably in the ranges. When the particles having the refractive index in the ranges are used, parallax may be further reduced.

An absolute value of a refractive index difference between the particles and the pressure-sensitive adhesive is preferably in a range of 0.0 to 0.1, more preferably in a range of 0.0 to 0.06, and further more preferably in a range of 0.01 to 0.06. When the absolute value of the refractive index difference between the particles and the pressure-sensitive adhesive exceeds 0.1, visibility under a bright environment is likely to reduce by interface reflection of outside light. The absolute value of the refractive index difference may be 0.0, that is, the particles and the pressure-sensitive adhesive may be equal in refractive index to each other.

The amount of particles contained in the light diffusion pressure-sensitive adhesion layer is preferably in a range of 0.3% by weight to 50% by weight, and more preferably in a range of 3% by weight to 48% by weight. When the amount of particles is set in the ranges described above, a light diffusion pressure-sensitive adhesion layer having excellent light diffusion performance may be obtained.

The light diffusion pressure-sensitive adhesion layer may contain any suitable additive except for the pressure-sensitive adhesive and the particles. Examples of the additive include an antistatic agent and an antioxidant.

As a method of forming the light diffusion pressure-sensitive adhesion layer, any suitable method may be used. For example, there is a method of applying a coating liquid obtained by the adding particles, little by little, to a solution prepared by adding a solvent to a pressure-sensitive adhesive with agitating onto a support, and performing drying to obtain the light diffusion pressure-sensitive adhesion layer. When the light diffusion pressure-sensitive adhesion layer is formed by the method, any suitable solvent, applying method, and drying method may be used.

<A-3. Protective Film>

The protective films 30, 31 are formed of any appropriate film which can be used as a protective film for a polarizing plate. Specific examples of a material used as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Another example thereof includes a thermosetting resin or a UV-curing resin such as a (meth)acrylic-based resin, an urethane-based resin, a (meth)acrylic urethane-based resin, an epoxy-based resin, or a silicone-based resin. Still another example thereof includes, for example, a glassy polymer such as a siloxane-based polymer. Further, a polymer film described in JP 2001-343529 A (WO 01/37007) may also be used. To be specific, the film can be formed of a resin composition containing a thermoplastic resin having a substituted or unsubstituted imide group on a side chain and a thermoplastic resin having a substituted or unsubstituted phenyl group and a nitrile group on a side chain. A specific example thereof includes a resin composition containing an alternate copolymer of isobutene and N-methylmaleimide and an acrylonitrile-styrene copolymer. The polymer film may be an extruded product of the resin composition, for example.

Preferably, the above protective film (inner protective film) 31 exhibits optical isotropy. Specifically, the thickness direction retardation Rth (550) of the inner protective film is preferably −20 nm to +20 nm, more preferably −10 nm to +10 nm, much more preferably −6 nm to +6 nm, and particularly preferably −3 nm to +3 nm. The in-plane retardation Re (550) of the inner protective film is preferably 0 nm or more and 10 nm or less, more preferably 0 nm or more and 6 nm or less, and much more preferably 0 nm or more and 3 nm or less. The details of films forming such a protective film having optical isotropy are described in JP 2008-180961 A, which is incorporated herein by reference.

B. Liquid Crystal Display Device

Figure 2:
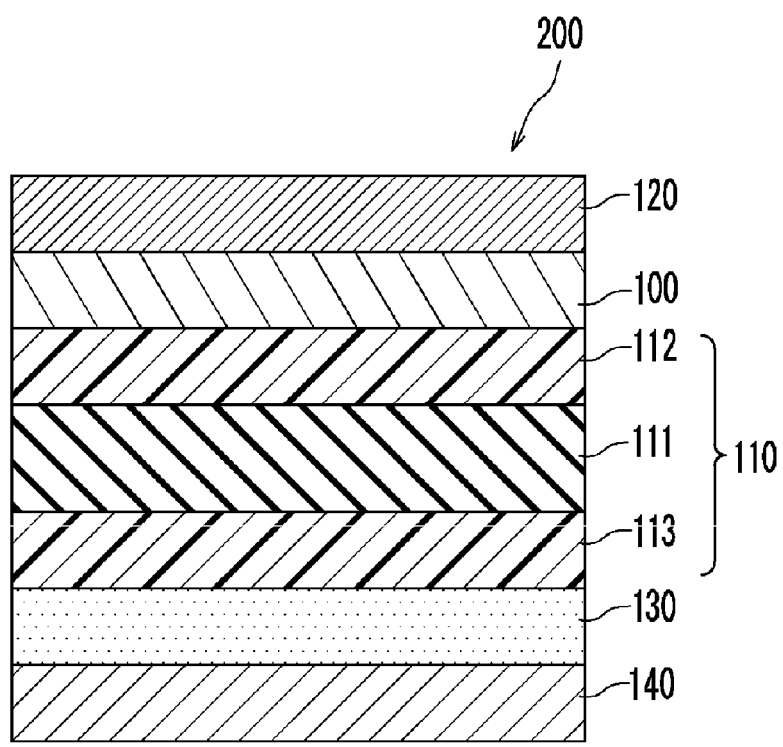
FIG. 2 is a schematic cross sectional view of a liquid crystal display device according to a preferred embodiment of the present invention.

A liquid crystal display device according to the present invention includes a liquid crystal cell, the composite polarizing plate placed on a viewer side of the liquid crystal cell, a polarizing plate placed opposite side to the viewer side of the liquid crystal cell, a front substrate which is placed on a viewer side of the composite polarizing plate and in intimate contact with the light diffusion pressure-sensitive layer of the composite polarizing plate, and a collimated light source device placed outside the polarizing plate opposite side to the viewer side. FIG. 2 is a schematic cross sectional view of the liquid crystal display device according to a preferred embodiment of the present invention. A liquid crystal display device 200 includes a front substrate 120, the composite polarizing plate 100, a liquid crystal cell 110, a polarizing plate 130, and a collimated light source device 140, which are arranged in the stated order from the viewer side. The liquid crystal cell 110 includes a pair of substrates 112 and 113 and a liquid crystal layer 111 serving as a display medium interposed between the substrates. In the liquid crystal display device 200, the composite polarizing plate 100 is placed on a viewer side of the liquid crystal cell 110. The composite polarizing plate 100 is placed so that the light diffusion pressure-sensitive adhesion layer 20 is in contact with the front substrate 120. Therefore, in the liquid crystal display device 200, the light diffusion pressure-sensitive adhesion layer 20 is placed over the entire region between the composite polarizing plate 100 and the front substrate 120, and hence no air layer is formed between the composite polarizing plate 100 and the front substrate 120. Although not illustrated, the liquid crystal display device 200 may further include another constituent element, for example, an another polarizer, a protective film, or an optical compensation layer. An adhesive layer or pressure-sensitive adhesive layer (not shown) may be provided between the liquid crystal cell 110 and the composite polarizing plate 100 and/or the polarizing plate 130.

The collimated light source device 140 is placed on the side of the liquid crystal cell 110 on which the composite polarizing plate 100 is not located. The collimated light source device 140 is placed in this way, to thereby obtain a liquid crystal display device which has an excellent viewing angle characteristic and is capable of suppressing gray level inversion. Further, the collimated light source device is used for the liquid crystal display device together with the composite polarizing plate according to the present invention, which prevents an air layer from being formed, to thereby make significant a front contrast ratio improvement effect obtained by using the collimated light source device.

The liquid crystal display device according to the present invention is not particularly limited as long as the liquid crystal display device includes the composite polarizing plate according to the present invention and the collimated light source device, and preferably, further includes the liquid crystal cell and the front substrate. To be specific, any of a transmission type, a reflection type, and a semi-transmission type may be used. A transmission type liquid crystal display device for performing display using a backlight is preferably used.

<B-1. Front Substrate>

As the front substrate 120, any suitable substrate placed on a viewer side surface of the liquid crystal display device may be used. The front substrate is preferably a transparent protective plate for protecting the liquid crystal cell, or a touch panel. Any suitable plate may be used as the transparent protective plate. To be specific, a glass plate or a plastic plate is used. The plastic plate, for example, an acrylic plate is preferably used. The touch panel is not particularly limited, and any type, for example, a resistive type, a capacitance type, or an optical type may be used. The touch panel in the present invention is placed above the polarizing plate, and hence the resistive type is preferably used.

The resistive touch panel includes a movable electrode portion, a fixed electrode portion, and a spacer placed between the movable electrode portion and the fixed electrode portion. The movable electrode portion and the fixed electrode portion each are a laminate which includes a transparent conductive film and a transparent support, for example, a glass substrate or a transparent resin film. In the resistive touch panel, the transparent conductive film of the movable electrode portion and the transparent conductive film of the fixed electrode portion are opposed to each other through the spacer. In the resistive touch panel, the movable electrode portion is provided on the viewer side. When the movable electrode portion is pressed by a finger or a pen at the time of input, the movable electrode portion comes into contact with the fixed electrode portion and thus a current flows therebetween, and hence a contact position is detected.

<B-2. Liquid Crystal Cell>

Examples of the driving mode using a liquid crystal cell include a vertical alignment (VA) mode, a twisted nematic (TN) mode, an in-plane switching (IPS) mode, a vertical alignment type electric field control birefringence (ECB) mode, and an optical compensation birefringence (OCB) mode.

<B-3. Collimated Light Source Device>

The collimated light source device 140 is a collimated light source device for emitting collimated light to the liquid crystal cell 110. The collimated light source device may have any suitable structure capable of emitting the collimated light. For example, the collimated light source device includes a light source and a condensing element for collimating light emitted from the light source (each of which is not shown). In this case, any suitable condensing element capable of collimating light emitted from the light source may be employed as the condensing element. When the light source itself may emit the collimated light, the condensing element may be omitted. The followings are exemplified as a specific structure of the collimated light source device: (1) a structure in which a condensing element in which a light shielding layer or a reflection layer is provided in a portion except a lens focus, on a flat surface side of a lenticular lens or cannonball type lens is located on a liquid crystal cell side of a light source (for example, cold cathode fluorescent lamp) (for example, JP 2008-262012 A); (2) a structure which includes a side light type LED light source, a light guide plate of the side light type LED light source, and a angle variation prism which has a convex surface formed on a light guide plate side and is placed on a liquid crystal cell side of the light guide plate (in this structure, anisotropic diffusion element may be further used if necessary; for example, JP 3442247 B), (3) a structure in which a louver layer in which a light absorbing resin and a transparent resin are alternately formed in a stripe shape is placed between a backlight and a backlight-side polarizing plate (for example, JP 2007-279424 A); (4) a structure using a cannonball type LED as a light source (for example, JP H06-130255 A); (5) a structure using a Fresnel lens and, if necessary, a diffusion plate (for example, JP H01-126627 A); and (6) a structure which includes a Fresnel type reflection mirror and an LED light source placed at the center thereof (for example, JP 2004-186092 A). The documents describing the detailed structures are incorporated by reference in this specification. Hereinafter, the structure of (5) is described as an example.

Figure 3A:
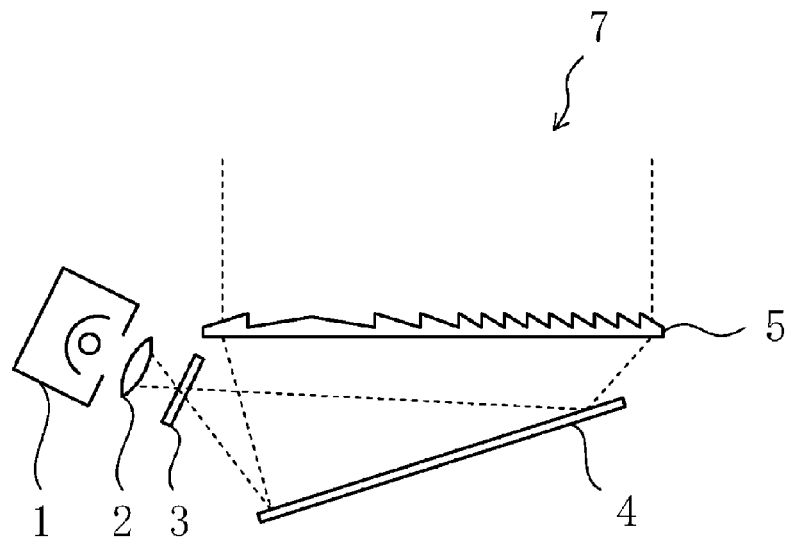
FIG. 3A is a schematic view of one embodiment of a collimated light source device used in the present invention.

FIG. 3A is a schematic view illustrating the collimated light source device having the structure of (5). A collimated light source device 7 includes a light source 1, a projection lens 2, a lenticular lens 3, a reflection plate 4, and a Fresnel lens 5. A light-beam emitted from the light source 1 passes through the projection lens 2 and the lenticular lens 3 and is reflected on a mirror surface of the reflection plate 4. The reflected light beam passes through the Fresnel lens 5 and exits as collimated light.

Figure 3B:
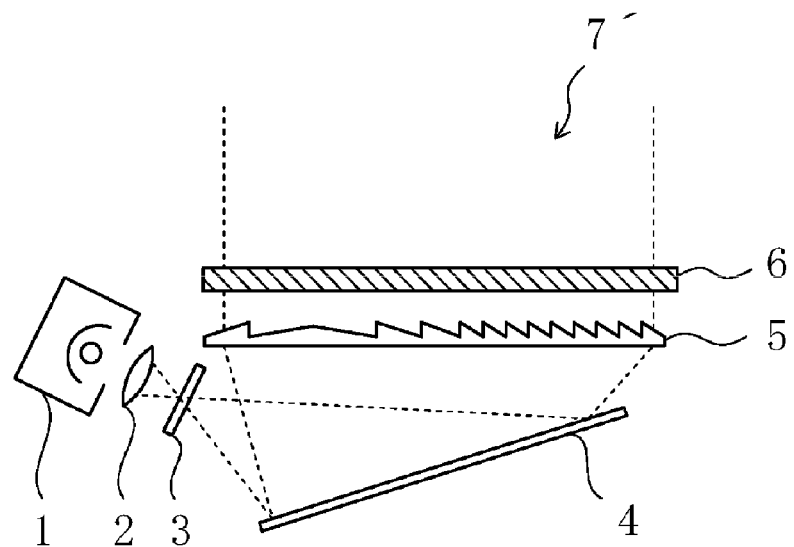
FIG. 3B is a schematic view of another embodiment of the collimated light source device used in the present invention.

In the collimated light source device having the structure of (5), a diffusion element for providing desired diffusion is preferably placed on a light source side or a liquid crystal cell side of the Fresnel lens of a projection type backlight unit. FIG. 3B illustrates a structure in which a diffusion element 6 is provided on the liquid crystal cell side of the Fresnel lens 5. A light beam emitted from the light source 1 passes through the projection lens 2 and the lenticular lens 3 and is reflected on the mirror surface of the reflection plate 4. The reflected light beam passes through the Fresnel lens 5 and exits as collimated light. The exited collimated light passes through the diffusion element 6 and is diffused for irradiation.

With respect to the diffusion property of the diffusion element, a haze is preferably in a range of 2% to 92%, and more preferably in a range of 30% to 80%. With respect to the diffusion property of the diffusion element, a light diffusion half angle is preferably in a range of 1° to 30°, and more preferably in a range of 5° to 20°. The diffusion element may include a straight-transmitted component. With respect to the light diffusion half angle in this case, a half angle of diffusion light except for the straight-transmitted component is preferably in a range of 1° to 30°.

As the diffusion element having the performance described above, any suitable diffusion element may be used. To be specific, a surface unevenness diffusion film or an internal diffusion film which is obtained by applying a binder containing fine particles onto a transparent substrate film, a phase separation extrusion sheet which is mixed with an incompatible resin and formed by extrusion, and an embossed sheet of which a surface is formed with an unevenness pattern by an embossing roller may be used for the diffusion element. In addition, a lens-diffusion element integral structure provided with a fine unevenness shape on one surface or both surfaces of Fresnel lens by a method such as applying a binder containing fine particles may be used.

Figure 4:
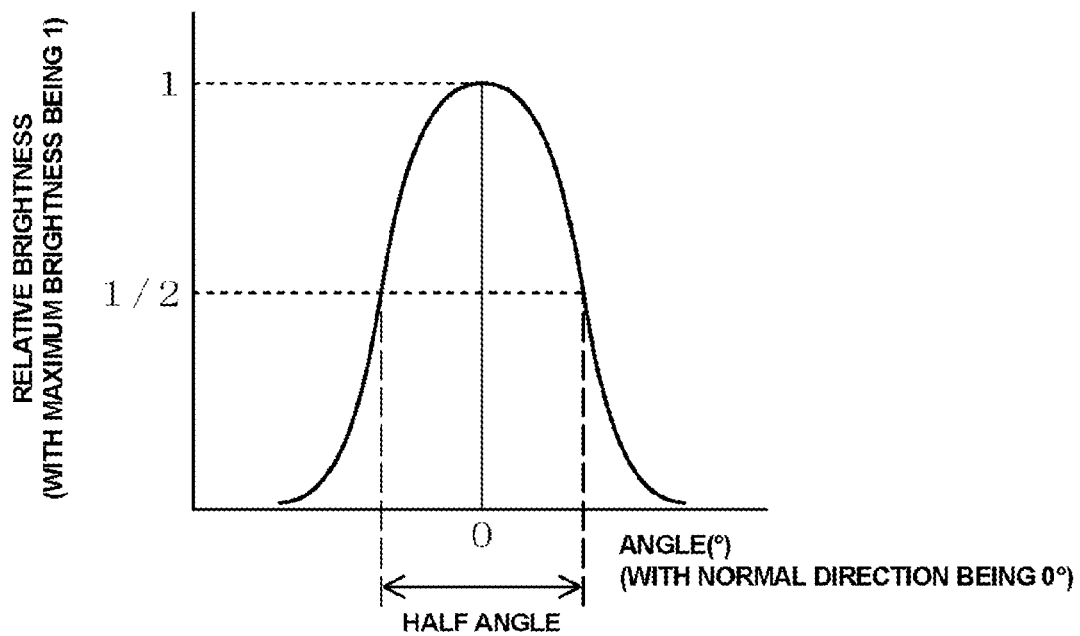
FIG. 4 is a schematic diagram explaining a method of calculating a half angle in the present invention.

With respect to the diffusion performance of the collimated light source device described above, a half angle is preferably in a range of 1° to 40°, more preferably in a range of 2° to 30°, and further more preferably in a range of 2.5° to 20°. In a case where the half angle is smaller than 1°, even when the diffusion performance of the light diffusion pressure-sensitive adhesion layer is improved, glare (dazzling) may not be reduced. When the half angle exceeds 40°, oblique light which is not completely compensated is generated in black display and diffused to the front side by the light diffusion pressure-sensitive adhesion layer, and hence it is likely to increase brightness in a black display to reduce the front contrast ratio. In the present invention, as illustrated in FIG. 4, the half angle means a full width at half maximum brightness of angles in a brightness profile, when an angle is varied in omnidirections. When the half angle is smaller than 1° but a diffusion range is widened, the same effect as in the case where the half angle is equal to or larger than 1° may be obtained. For example, when an average diffusion angle $\theta_d$ expressed by the following expression is equal to or larger than 1°, glare (dazzling) may be reduced by a combination with the light diffusion pressure-sensitive adhesion layer which causes multiple diffusion.

$$\theta_d = 2 \times \frac{\int_{\phi=0}^{2\pi} \int_{\theta=0}^{\pi/2} \theta \cdot \{L(\phi, \theta)\cos\theta\}\sin\theta \, d\theta \, d\phi}{\int_{\phi=0}^{2\pi} \int_{\theta=0}^{\pi/2} \{L(\phi, \theta)\cos\theta\}\sin\theta \, d\theta \, d\phi}$$

$L(\phi, \theta)$: Brightness of back light

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

According to the liquid crystal display device of the present invention, visibility under a bright environment is excellent, parallax may be reduced, and the liquid crystal display device may be thinned. Therefore, the present invention is particularly useful for, for example, a cellular phone and a product using a touch panel.

The present invention is further described with reference to examples and comparative examples. The present invention is not limited to the examples. Respective analysis methods used in the examples are as follows.

(1) Method of Measuring Half Angle

With respect to the half angle of the collimated light source device, as illustrated in FIG. 4, a full width at half maximum of emission angles corresponding to a half of a maximum value of brightness (normally, brightness at emission angle of 0°) in an emission profile is set as the half angle.

(2) Method of measuring Haze and Total Light Beam Transmittance

A haze meter (produced by Murakami Color Research Laboratory Co., Ltd, product name "HN-150") is used for measurement using a method based on the JIS 7136 standard.

(3) Method of Measuring Light Diffusion Half Angle

Figure 5:
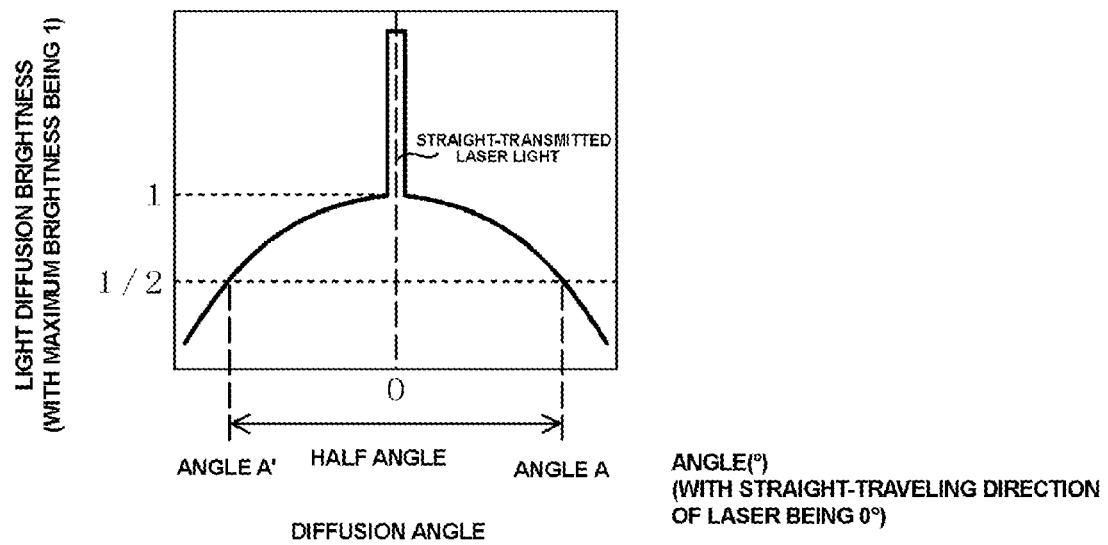
FIG. 5 is a schematic diagram explaining a method of calculating a light diffusion half angle in the present invention.

A laser light beam is emitted from the front of the light diffusion pressure-sensitive layer. A diffusion brightness corresponding to a diffusion angle of diffused light is measured every 1° by a goniophotometer. As illustrated in FIG. 5, diffusion angles corresponding to a half of a maximum value of diffusion brightness of light beams except straight-transmitted laser light beam are measured on both sides of a diffusion profile. A value obtained by adding the angles measured on both sides ("(angle A)+(angle A')" in FIG. 5) is set as the light diffusion half angle.

(4) Method of Measuring Front White Brightness and Front Brightness in a Black Display A fluorescent lamp (200 lx: measurement value obtained by illuminometer IM-5) is provided for irradiation so that emission light is incident at an angle of 30° with respect a vertical direction of the liquid crystal display device. A luminance meter (produced by Topcon Corporation, product name "SR-UL1", 500 mm in measurement distance, 1° in measurement angle) is provided as a measurement device to measure front brightness in a white display and a black display.

(5) Method of Measuring Parallax

Under a bright room environment, a deviation between a point depressed by a touch pen and a display portion is visually observed from a position of 20° with respect to a direction vertical to a screen of the liquid crystal display device at a distance of 300 mm. A point which is not deviated from the display portion is indicated by a white circle mark (○) and a point which is deviated from the display portion is indicated by a cross mark (x).

(6) Method of Measuring Viewing Angle Characteristics

A conoscope (produced by AUTRONIC-MELCHERS GmbH, product name "Conoscope") is used for measurement under a dark environment.

Production of Collimated Light Source Device

Reference Example 1

The collimated light source device having the structure illustrated in FIG. 3A is produced as follows. A projection lens, a lenticular lens (spot-shaped slit), an aluminum specular reflector, and an acrylic Fresnel lens (20 inches in diagonal size, focal length f=40 cm) are placed at the front of a metal halide lamp light source of 100 W to produce a collimated light source device 1. The half angle of the collimated light source device 1 is 2.5°.

Reference Example 2

The collimated light source device having the structure illustrated in FIG. 3B is produced as follows. The same structure as in the case of Reference Example 1 except that a uneven surface light diffusion sheet (60% in haze and 10° in light diffusion half angle) is placed on a liquid crystal cell side of a Fresnel lens of a backlight unit is employed to produce a collimated light source device 2. The half angle of the collimated light source device 2 is 9.0°.

Reference Example 3

The same structure as in the case of Reference Example 2 except for using a uneven surface light diffusion sheet having a haze of 70% and a light diffusion half angle of 15° is employed to produce a collimated light source device 3. The half angle of the collimated light source device 3 is 15°.

Production of Composite Polarizing Plate

Reference Example 4

In order to obtain a coating liquid for forming a light diffusion pressure-sensitive adhesion layer, 100 parts by weight of a coating liquid (solid content: 12% by weight) of an acrylic pressure-sensitive adhesive are added with 3.8 parts by weight of silicone fine particles (produced by Momentive Performance Materials Japan Inc., product name "Tospearl 140", 4.2 μm in particle diameter) and agitation is performed for one hour. The coating liquid for forming the light diffusion pressure-sensitive adhesion layer is applied on a PET film (separator) which is subjected to light peeling treatment, and drying is performed at 120° C. to obtain a coating layer having a thickness of 25 μm. The application and drying processes are repeated three times to produce a light diffusion pressure-sensitive adhesion layer (75 μm in thickness) in which three coating layers are laminated. The light diffusion pressure-sensitive adhesion layer has a haze of 97%, a total light beam transmittance of 89%, and a light diffusion half angle of 31°.

Then, the separator provided with the light diffusion pressure-sensitive adhesion layer and a polarizing plate (produced by Nitto Denko Corporation, product name "NWF-LNSEG") each are cut into A4 size, and bonded to each other so that the light diffusion pressure-sensitive adhesion layer is in intimate contact with the polarizing plate, to thereby produce a composite polarizing plate 1.

Reference Example 5

A composite polarizing plate 2 is produced by the same method of Reference Example 4 except that the additive amount of silicone fine particles (produced by Momentive Performance Materials Japan Inc., product name "Tospearl 140", 4.2 μm in particle diameter) is set to 1.9 parts by weight. With respect to the light diffusion pressure-sensitive adhesion layer of the composite polarizing plate 2, a haze is 60% but a light diffusion half angle is unmeasurable.

Production of Liquid Crystal Display Device

Example 1

A twisted nematic (TN) liquid crystal cell is bonded to a polarizer-side surface of the composite polarizing plate produced in Reference Example 4 and then the separator is peeled. After that, an acrylic plate (transparent acrylic plate used in cellular phone (product name "W43H") produced by Hitachi, Ltd., 485 μm in thickness) serving as the front substrate is bonded in intimate contact with the exposed light diffusion pressure-sensitive adhesion layer. Then, a polarizing plate (produced by Nitto Denko Corporation, product name "NWF-LNSEG") is bonded to a surface of the liquid crystal cell to which the composite polarizing plate is not bonded. The collimated light source device 1 is placed outside the polarizing plate to produce a liquid crystal display device having a structure exhibited in Table 1. Characteristics of the obtained liquid crystal display device are exhibited in Table 2.

TABLE 1

| Example 1 | Comparative Example 1 | | |
|---|---|---|---|
| Acrylic plate | Acrylic plate | | |
| — | Double-faced tape | Air layer | Double-faced tape |
| — | Light transmitting film | | |
| Light diffusion pressure-sensitive adhesion layer | Light diffusion pressure-sensitive adhesion layer | | |
| Polarizing plate | Polarizing plate | | |
| Liquid crystal cell | Liquid crystal cell | | |
| Polarizing plate | Polarizing plate | | |
| Collimated light source device 1 | Collimated light source device 1 | | |

TABLE 2

| | Half width of collimated light source device (°) | Front substrate | Bright Environment (200 lx) | | | |
|---|---|---|---|---|---|---|
| | | | Front white brightness (cd/m$^2$) | Front brightness in black display (cd/m$^2$) | Front contrast ratio | Parallax |
| Example 1 | 2.5 | Acrylic plate | 289.8 | 0.8867 | 326.9 | ○ |
| Comparative Example 1 | | | 275.0 | 0.9233 | 297.8 | x |
| Example 2 | 9.0 | Acrylic plate | 244.9 | 0.8472 | 289.0 | ○ |
| Comparative Example 2 | | | 230.6 | 0.8733 | 264.1 | x |
| Example 3 | 15 | Acrylic plate | 231.6 | 0.8194 | 282.7 | ○ |
| Comparative Example 3 | | | 217.1 | 0.8578 | 253.1 | x |
| Example 4 | 2.5 | Touch panel | 217.2 | 0.7346 | 295.7 | ○ |
| Comparative Example 4 | | | 204.6 | 0.7572 | 270.1 | x |
| Comparative Example 5 | — | Acrylic plate | 276.5 | 1.1872 | 232.9 | x |
| Comparative Example 6 | — | Acrylic plate | 275.8 | 1.0607 | 150 | ○ |
| Comparative Example 7 | — | Acrylic plate | 275 | 1.09 | 300 | x |

Example 2

The same structure as in the case of Example 1 except that the collimated light source device 2 is used instead of the collimated light source device 1 is employed to produce a liquid crystal display device. Characteristics of the obtained liquid crystal display device are exhibited in Table 2.

Example 3

The same structure as in the case of Example 1 except that the collimated light source device 3 is used instead of the collimated light source device 1 is employed to produce a liquid crystal display device. Characteristics of the obtained liquid crystal display device are exhibited in Table 2.

Comparative Example 1

The same structure as in the case of Example 1 except that a light transmitting film (produced by Fujifilm Corporation, product name "FUJITAC", 40 μm in thickness) is bonded to the exposed light diffusion pressure-sensitive adhesion layer, and a double-faced tape (produced by Nitto Denko Corporation, product name "No. 5102", 120 μm in thickness) is placed on edge portions of the light transmitting film to bond an acrylic plate to the light transmitting film is employed to produce a liquid crystal display device having a structure exhibited in Table 1. Characteristics of the obtained liquid crystal display device are exhibited in Table 2.

Comparative Example 2

The same structure as in the case of Comparative Example 1 except that the collimated light source device 2 is used instead of the collimated light source device 1 is employed to produce a liquid crystal display device. Characteristics of the obtained liquid crystal display device are exhibited in Table 2.

Comparative Example 3

The same structure as in the case of Comparative Example 1 except that the collimated light source device 3 is used instead of the collimated light source device 1 is employed to produce a liquid crystal display device. Characteristics of the obtained liquid crystal display device are exhibited in Table 2.

Example 4

The same structure as in the case of Example 1 except that a touch panel (resistive touch panel used in NOTE-PC (product name "Shield PRO" produced by NEC corporation), 945 μm in thickness) instead of the acrylic plate is used as the front substrate is employed to produce a liquid crystal display device having a structure exhibited in Table 3. Characteristics of the obtained liquid crystal display device are exhibited in Table 2.

TABLE 3

| Example 4 | | Comparative Example 4 | |
|---|---|---|---|
| Glass plate | Touch panel | Glass plate | Touch panel |
| Conductive thin film | | Conductive thin film | |
| Spacer | | Spacer | |
| Conductive thin film | | Conductive thin film | |
| Glass plate | | Glass plate | |
| — | | Double-faced tape | Air layer | Double-faced tape |
| — | | Light transmitting film | |
| Light diffusion pressure-sensitive adhesion layer | | Light diffusion pressure-sensitive adhesion layer | |
| Polarizing plate | | Polarizing plate | |
| Liquid crystal cell | | Liquid crystal cell | |
| Polarizing plate | | Polarizing plate | |
| Collimated light source device 1 | | Collimated light source device 1 | |

Comparative Example 4

The same structure as in the case of Comparative Example 1 except that a touch panel used in Example 4 instead of the acrylic plate is used as the front substrate is employed to produce a liquid crystal display device having a structure exhibited in Table 3. Characteristics of the obtained liquid crystal display device are exhibited in Table 2.

Comparative Example 5

A polarizing plate (produced by Nitto Denko Corporation, product name "NWF-LNSEG") is bonded to a viewer side of the TN liquid crystal cell. A double-faced tape (produced by Nitto Denko Corporation, product name "No. 5102", 120 μm in thickness) is placed on edge portions of the polarizing plate to laminate the same acrylic plate as in Example 1 and the polarizing plate by bonding. A polarizing plate (produced by Nitto Denko Corporation, product name "NWF-LNSEG") is bonded to a backlight side of the liquid crystal cell. After that, a diffusion light source device (backlight unit used in cellular phone (product name "W43H") produced by Hitachi, Ltd.) is placed on the backlight side of the liquid crystal cell to produce a liquid crystal display device having a structure exhibited in Table 4. For structural comparison, Table 4 further exhibits the structure of the liquid crystal display device according to Example 1. Characteristics of the obtained liquid crystal display are exhibited in Table 2.

TABLE 4

| Example 1 | Comparative Example 5 | | |
| --- | --- | --- | --- |
| Acrylic plate | Acrylic plate | | |
| Light diffusion pressure-sensitive adhesion layer | Double-faced tape | Air layer | Double-faced tape |
| Polarizing plate | Polarizing plate | | |
| Liquid crystal cell | Liquid crystal cell | | |
| Polarizing plate | Polarizing plate | | |
| Collimated light source device 1 | Diffusion light source device | | |

Comparative Example 6

The same structure as in the case of Example 1 except that the diffusion light source device used in Comparative Example 5 is used instead of the collimated light source device 1 is employed to produce a liquid crystal display device having a structure exhibited in Table 5. For structural comparison, Table 5 further exhibits the structure of the liquid crystal display device according to Example 1. Characteristics of the obtained liquid crystal display device are exhibited in Table 2.

TABLE 5

| Example 1 | Comparative Example 6 |
| --- | --- |
| Acrylic plate | Acrylic plate |
| Light diffusion pressure-sensitive adhesion layer | Light diffusion pressure-sensitive adhesion layer |
| Polarizing plate | Polarizing plate |
| Liquid crystal cell | Liquid crystal cell |
| Polarizing plate | Polarizing plate |
| Collimated light source device 1 | Diffusion light source device |

Comparative Example 7

The same structure as in the case of Example 1 except that the composite polarizing plate 2 obtained in Reference Example 5 is used instead of the composite polarizing plate 1 and the diffusion light source device used in Comparative Example 5 is used instead of the collimated light source device 1 is employed to produce a liquid crystal display device. Characteristics of the obtained liquid crystal display device are exhibited in Table 2.

Evaluation

As is apparent from Table 2, when Examples 1 to 3 are compared with Comparative Example 5 exhibiting the conventional structure, a viewer side thickness may be reduced. When Examples 1 to 4 are compared with Comparative Example 5, in a bright environment, white brightness may be improved, brightness in black display may be suppressed, and a front contrast ratio is significantly improved. In Examples 1 to 3, the light diffusion pressure-sensitive adhesion layer acts as a screen, and hence a screen position (intermediate portion of light diffusion pressure-sensitive adhesion layer) is equal to or smaller than a half of a screen position (intermediate portion of color filter of liquid crystal cell) in Comparative Example 5, to thereby reduce parallax. Even in Example 4 in which the touch panel is used as the front substrate, the light diffusion pressure-sensitive adhesion layer acts as a screen, and hence the screen position becomes closer than in Comparative Example 5 without depending on the viewer side thickness, to thereby reduce parallax.

When Examples 1 to 4 are compared with Comparative Examples 1 to 4, the viewer side thickness may be reduced. In addition, when Examples 1 to 4 are compared with Comparative Examples 1 to 4, in the bright environment, the white brightness is improved, the brightness in black display is suppressed, and the front contrast ratio (CR) is improved by approximately 10%. Further, when Examples 1 to 4 are compared with Comparative Examples 1 to 4, the parallax is reduced.

When Example 1 in which the collimated light source device is used is compared with Comparative Example 6 in which the diffusion light source device is used, in the bright environment, the white brightness is improved, the brightness in black display is suppressed, and the front contrast ratio (CR) is improved by approximately 25%. In Example 1, the front contrast ratio (CR) is improved and the parallax is reduced, and hence the compatibility is obtained. In contrast to this, in Comparative Example 7 in which the diffusion light source device is used, the front contrast ratio is improved, but the light diffusion pressure-sensitive adhesion layer does not sufficiently act as the screen because of a low haze, and the parallax is large.

Figure 6:
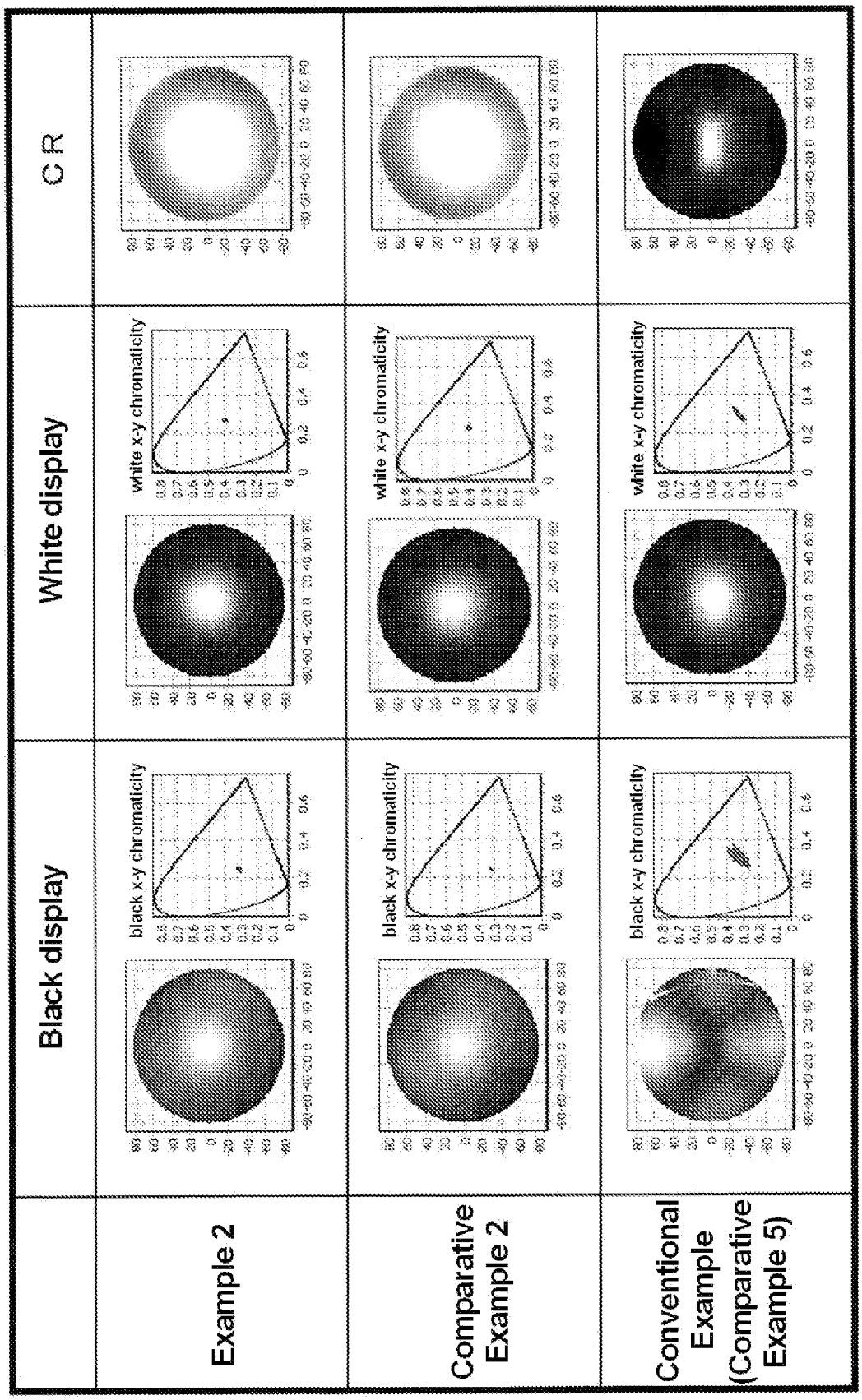
FIG. 6 is a contrast contour map of viewing angle dependences of black display, white display, and contrast of liquid crystal display devices according to Example 2 of the present invention and Comparative Examples 2 and 5.

FIG. 6 illustrates viewing angle characteristics in Example 2 and Comparative Examples 2 and 5. In a brightness contour map of black display, a white region indicates low brightness and a black region indicates high brightness. In a brightness contour map of white display, a white region indicates high brightness and a black region indicates low brightness. In a contrast contour map, a white region indicates a high contrast and a black region indicates a low contrast. As is apparent from FIG. 6, when Example 2 and Comparative Example 2 in each of which light emitted from the collimated light source device is excellently diffused by the light diffusion pressure-sensitive adhesion layer are compared with Comparative Example 5 exhibiting the conventional structure, with respect to any of the white display, the black display, and the front contrast ratio under the bright environment, the visibility under the bright environment is improved.

What is claimed is:

1. A liquid crystal display device, comprising:
a liquid crystal cell;
a composite polarizing plate comprising a polarizer and a light diffusion pressure-sensitive adhesion layer placed on a side of the polarizer which is placed on a viewer side of the liquid crystal cell;
a polarizing plate which is placed opposite side to the viewer side of the liquid crystal cell;
a front substrate which is placed on a viewer side of the composite polarizing plate and in intimate contact with the light diffusion pressure-sensitive layer of the composite polarizing plate; and
a collimated light source device placed outside the polarizing plate opposite to the viewer side; wherein
the light diffusion pressure-sensitive adhesion layer includes a pressure-sensitive adhesive and inorganic fine particles and/or polymer fine particles, and has a haze equal to or larger than 90%.

2. A liquid crystal display device according to claim 1, wherein the front substrate comprises a transparent protective plate or a touch panel.

3. A liquid crystal display device according to claim 1, wherein a half angle of the collimated light source device is in a range of 1° to 40°.

* * * * *